No. 688,683. Patented Dec. 10, 1901.
G. W. PHILLIPS.
DEVICE FOR STOPPING LEAKAGE.
(Application filed Feb. 23, 1899.)
(No Model.)
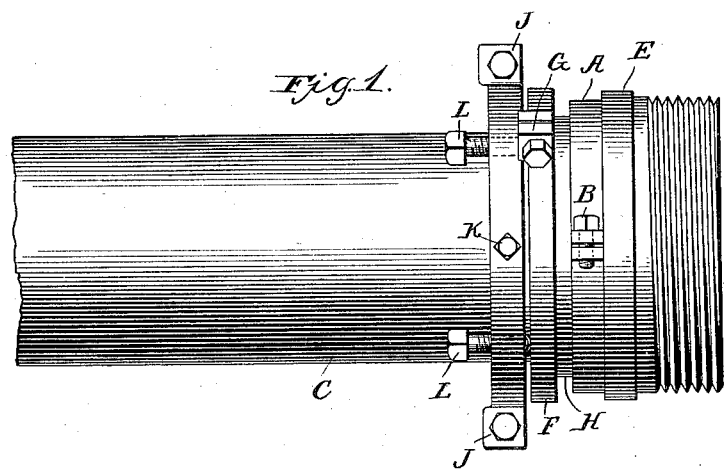
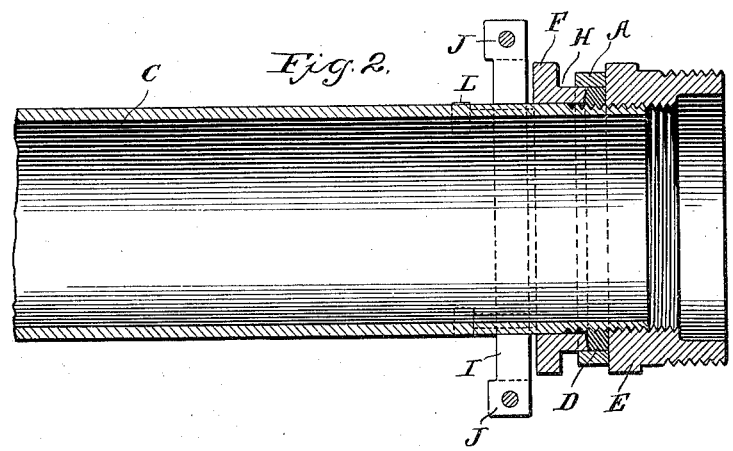
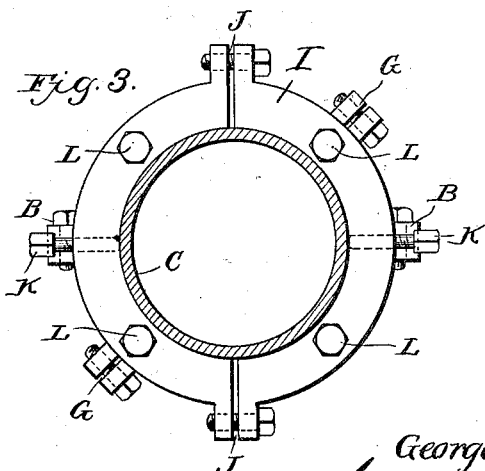
Witnesses
E. C. Wurdeman
Samuel Stuart
Inventor
George W. Phillips
by Geo. C. Hazelton
Attorney

UNITED STATES PATENT OFFICE.

GEORGE W. PHILLIPS, OF CAMDEN, NEW JERSEY.

DEVICE FOR STOPPING LEAKAGE.

SPECIFICATION forming part of Letters Patent No. 688,683, dated December 10, 1901.

Application filed February 23, 1899. Serial No. 706,456. (No model.)

*To all whom it may concern:*

Be it known that I, GEORGE W. PHILLIPS, a citizen of the United States, residing at Camden, in the county of Camden and State of New Jersey, have invented a certain new and useful Improvement in Devices for Stopping Leakage, of which the following is a specification.

My invention relates to a new and useful improvement in devices for stopping leakage at pipe-couplings and upon valve-stems and the like without in any wise interfering with the pipe-coupling or stem, thus avoiding the necessity to shut down or turn off the steam, in case a leakage occurs, to repack or adjust the joint.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 represents a pipe and coupling, showing my improvement applied thereto for stopping the leakage; Fig. 2, a longitudinal section thereof, and Fig. 3 a cross-section.

In carrying out my invention as here embodied I provide a containing-ring A, which is made in two sections adapted to be secured together by bolts, as indicated at B, the object being to permit its being placed around a pipe C without disturbing the couplings, and when so placed and bolted together the packing D is placed therein in such manner as to abut against the face of the coupling E, as clearly shown in Fig. 2. F is likewise a sectional ring bolted together, as indicated at G, but of a diameter which more snugly fits the pipe C, but not intended to bind thereon. This ring has formed therewith an offset H, after the manner of a stuffing-box gland, and is adapted to pass within the containing-ring A, and thus bear against the packing D. I represents the adjusting-ring, which is also made in two sections and bolted together, as indicated at J, and this ring is intended to be clamped tightly against the pipe C, so as to have no movement thereon. For this purpose the set-bolts K are threaded through the ring, their inner ends adapted to bear firmly against the pipe. When these three rings are in position, any leakage between the pipe C and coupling E is stopped by the setting up of the adjusting-bolts L, which are threaded through the ring I and bear against the face of the ring F. The adjustment of these bolts, as is obvious, will force the packing D against the face of the coupling E and also by reason of the shape of the inner surface of the offset H cause said packing to be forced inward against the pipe C, thereby completely shutting off any leakage which may be taking place at this point.

By the use of a number of the adjusting-bolts L the setting up of the packing is made easy, since the strain is distributed upon all of these adjusting-bolts and which may be manipulated by a short wrench, a further advantage being that more or less pressure may be brought upon any portion of the packing by the proper manipulation of the adjusting-bolts.

One of the principal advantages of my improvement is that no sidewise or axial strain is brought to bear upon the coupling or pipe, and therefore the relation between these two members is not disturbed by the use of my improvement.

While I have shown my improvement adapted for use in connection with a pipe or a coupling, it is obvious that when made of proper size it may likewise be adapted for use upon valve-stems and the like for stopping leakage thereon without the necessity of shutting down to pack said valves.

Another advantage of my improvement is its exceeding simplicity and the small cost attendant upon its manufacture, the several parts being capable of being cast of malleable iron and requiring no finish, as they are not required to accurately fit the pipe or the coupling.

Having thus fully described my invention, what I claim as new and useful is—

1. Devices for stopping leakage, consisting of a containing-ring made in sections adapted to receive suitable packing, a gland-ring also made in sections adapted to bear against said packing, an adjusting-ring adapted to be made stationary, and adjusting-screws passed through the last-named ring for setting up the gland-ring, as specified.

2. In combination, a containing-ring made of two sections and adapted to be bolted around a pipe or the like and receive suitable packing, a gland-ring also made in two sections and adapted to be bolted around the pipe, an adjusting-ring likewise made in two sections and adapted to be bolted in contact with the pipe, set-screws threaded through said ring for holding it in position upon the pipe, and adjusting-bolts threaded through the last-named ring and adapted to force the gland-ring against the packing whereby the latter is compressed against the coupling and pipe to stop the leakage, as specified.

3. In a pipe-clamp, the combination with a removable annulus adapted to be fixedly supported upon a pipe, of a packing-strip movable longitudinally of the annulus and adapted for fixed engagement with an opposed face of a pipe-joint, and a plurality of independently-acting adjusting devices acting longitudinally of the pipe for effecting a fixed engagement between the packing-strip and an opposed face of a pipe-joint.

4. In a pipe-clamp, the combination with an annulus adapted to be fixedly supported upon a pipe, of an annular packing-strip, a ring encircling the packing-strip, and a plurality of independently-acting adjusting devices acting longitudinally of the pipe for effecting a fixed engagement between the packing-strip and an opposite face of the pipe-joint.

5. The combination with an annulus formed in sections, of means for securing said annulus about a pipe, a second annulus formed in sections and having a packing-face, and longitudinally-acting screws carried by the first-aforesaid annulus, adapted for engagement with the latter annulus to force the same longitudinally of the pipe and thereby effect fixed engagement between the packing-face and the pipe-joint.

6. The combination with an annulus formed in sections, of a plurality of radially-acting screws for fixing said annulus about a pipe, a second annulus formed in sections and having a packing-face, and longitudinally-acting screws carried by the first-aforesaid annulus, adapted for engagement with the latter annulus to force the same longitudinally of the pipe and thereby effect fixed engagement between the packing-face and the pipe-joint.

7. A detachable containing-ring to receive the packing, an annular packing within said ring, a detachable adjusting-ring adapted to be secured against movement upon the pipe, an annular gland-ring to bear against said packing, and a series of adjusting-screws as set forth.

8. A detachable containing-ring to receive the packing, an annular packing within said ring, a detachable adjusting-ring adapted to be secured against movement upon the pipe, an annular gland-ring to bear against said packing and a plurality of forcing devices acting upon the gland-ring to compress the packing.

9. A detachable containing-ring to receive the packing, an annular packing within said ring, a detachable adjusting-ring adapted to be secured against movement upon the pipe, an annular gland-ring to bear against said packing, and a series of adjusting-screws threaded through the adjusting-ring and bearing upon the gland-ring, as set forth.

In testimony whereof I have hereunto affixed my signature in the presence of two subscribing witnesses.

GEORGE W. PHILLIPS.

Witnesses:
MARY E. HAMER,
E. H. FORSYTH.